(12) United States Patent
Cooper et al.

(10) Patent No.: US 10,160,499 B2
(45) Date of Patent: Dec. 25, 2018

(54) ROCKER ASSEMBLY WITH A PULTRUDED LOAD DISTRIBUTION INSERT

(71) Applicant: FORD GLOBAL TECHNOLOGIES, LLC, Dearborn, MI (US)

(72) Inventors: Geoffrey John Cooper, Canton, MI (US); Paul Kenneth Dellock, Northville, MI (US); Stuart C. Salter, White Lake, MI (US); Scott Mair, Woodhaven, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 36 days.

(21) Appl. No.: 15/493,865

(22) Filed: Apr. 21, 2017

(65) Prior Publication Data

US 2018/0304932 A1    Oct. 25, 2018

(51) Int. Cl.
   *B62D 25/02*    (2006.01)
   *B62D 29/04*    (2006.01)

(52) U.S. Cl.
   CPC .......... *B62D 25/025* (2013.01); *B62D 29/043* (2013.01)

(58) Field of Classification Search
   CPC ............................ B62D 25/025; B62D 29/043
   USPC ........................................................ 296/209
   See application file for complete search history.

(56) References Cited

U.S. PATENT DOCUMENTS

| 6,378,933 B1* | 4/2002 | Schoen | B62D 29/002 |
| | | | 296/187.02 |
| 10,011,304 B1* | 7/2018 | Donabedian | B62D 25/025 |
| 2012/0103714 A1 | 5/2012 | Choi et al. | |
| 2015/0129116 A1* | 5/2015 | Richeton | B60R 19/03 |
| | | | 156/180 |
| 2015/0135940 A1 | 5/2015 | Rawlinson | |
| 2016/0325786 A1* | 11/2016 | Elfwing | B62D 25/025 |
| 2017/0361875 A1* | 12/2017 | Ayuzawa | B62D 21/15 |
| 2018/0134226 A1* | 5/2018 | Dellock | C25D 5/56 |
| 2018/0148099 A1* | 5/2018 | Ayukawa | B62D 21/155 |

FOREIGN PATENT DOCUMENTS

| DE | 102013102502 | 3/2013 | |
| DE | 102015207376 A1 * | 10/2016 | ............. B62D 25/02 |

OTHER PUBLICATIONS

Machine translation of DE102015207376A1, printed from the EPO website, Jul. 23, 2018.*

* cited by examiner

*Primary Examiner* — Jason S Morrow
(74) *Attorney, Agent, or Firm* — Jason Rogers; Brooks Kushman P.C.

(57) ABSTRACT

A rocker assembly includes a rocker reinforcement panel attached to a side inner panel to define a cavity and an elongated bar disposed within the cavity. The elongated bar is formed of a polymer resin that includes reinforcement strands of continuous fiber roving that are embedded in the polymer resin and extend along a full length of the bar. The elongated bar has a constant cross-section perpendicular to the length of the bar that may define at least one elongated opening. A method of making a rocker assembly includes pultruding a polymer resin and a continuous fiber roving to form a reinforced elongated bar that is assembled into a cavity defined between the rocker reinforcement panel and the side inner panel.

13 Claims, 3 Drawing Sheets

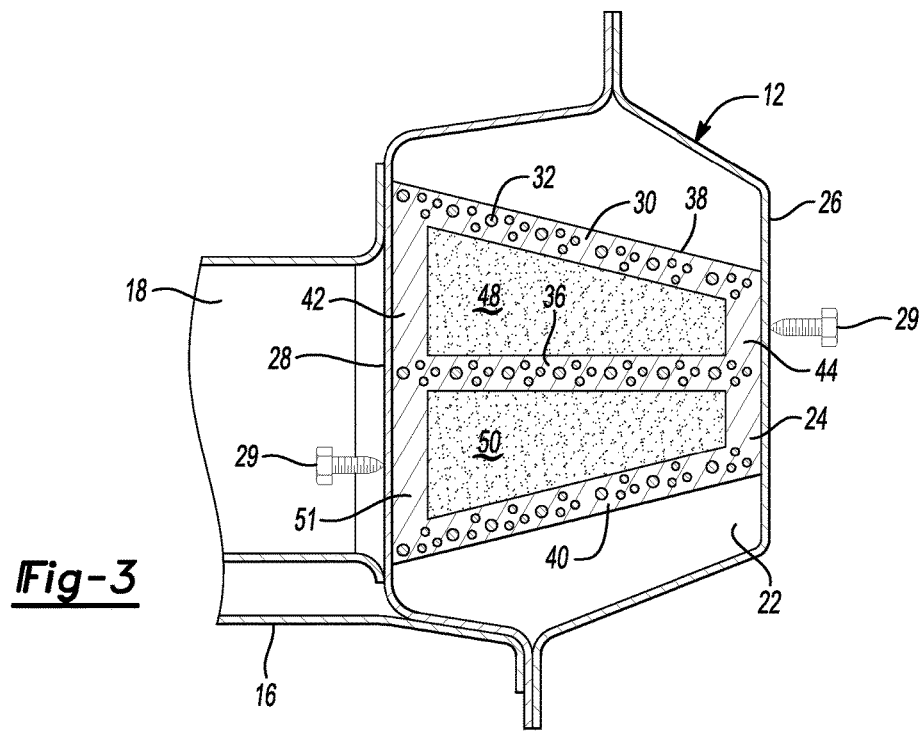
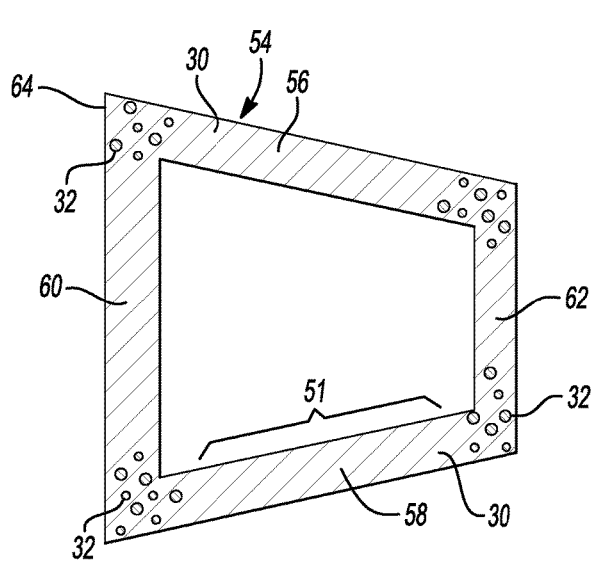
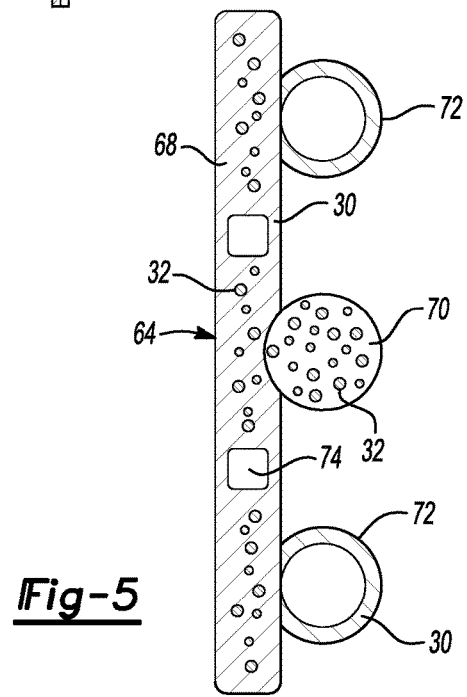

ROCKER ASSEMBLY WITH A PULTRUDED LOAD DISTRIBUTION INSERT

TECHNICAL FIELD

This disclosure relates to energy absorbing structures for vehicles that distribute loads applied in a collision along multiple load paths.

BACKGROUND

As $CO^2$ emissions requirements are being increased globally, automakers are endeavoring to meet ever increasing fuel economy standards. Efforts are being made to reduce vehicle mass and adopt alternative powertrains. Both combustion engines and electric vehicles benefit from reducing the weight of parts but reduction of the mass of parts cannot result in reduced product safety because vehicles are required to meet rigorous safety standards.

Alternative powertrains may include hybrid, hybrid electric and full electric vehicles that have large battery packs that may be packaged under the floor. The battery packs are rigid structures that are enclosed in cases that are designed protect the battery cells and do not deform in response to impacts caused by collisions. Crush zones for absorbing the force of impacts are minimized to increase the space available for larger battery packs for improved electric vehicle power range.

The extent of intrusions into both the battery pack retention area and the passenger compartment during high speed frontal, rear and side impacts must be minimized while maximizing energy absorption by surrounding structures. In side impacts the rocker assembly or side sill structures must absorb impacts with the limited crush space available between the side of the vehicle and the battery pack. In addition, rocker assemblies and side sill structures must be configured to absorb substantial impacts while providing a minimum weight penalty.

This disclosure is directed to solving the above problems and other problems as summarized below.

SUMMARY

According to one aspect of this disclosure, a rocker assembly is disclosed that includes a rocker reinforcement panel attached to a side inner panel to define a cavity and an elongated bar disposed within the cavity. The elongated bar is formed of a polymer resin that includes reinforcement strands of continuous fiber roving that are embedded in the polymer resin and extend along a full length of the bar.

According to other aspects of this disclosure, the elongated bar may have a constant cross-section perpendicular to the length of the bar that defines a plurality of elongated openings. A plurality of inner walls may be provided that divide the cavity into a plurality of sub-cavities that extend throughout the length of the bar.

A structural expanded foam polymer composition having a density of between 0.2 g/cc to 0.9 g/cc may be used to fill the sub-cavities. The expanded foam polymer composition may be polyurethane foam. The polymer resin may be polyethylene terephthalate. The reinforcement strands may be carbon fibers, glass fibers or basalt fibers.

The reinforcement strands may be located in specified areas of the elongated bar where it is desired to increase bar strength locally. The strands are spaced apart in other areas of the bar to provide areas of greater ductility and less strength. Fastener receiving strips may be provided that extend longitudinally in the areas of the bar that have greater ductility.

According to another aspect of this disclosure, a rocker assembly is disclosed that includes an elongated bar that includes polymer resin that includes reinforcement strands of continuous fiber roving that are embedded in the polymer resin. The bar is assembled inside a cavity defined by a rocker reinforcement panel and a side inner panel. The fiber roving extends through a full length of a plurality of outer walls of the bar. The elongated bar has a constant cross-section perpendicular to the length of the bar and at least one inner wall that divide an opening defined by the outer walls into a plurality of cells that extend throughout the length of the bar. The strands of continuous fiber roving that are embedded in the polymer resin extend along a full length of the inner or outer walls.

Another aspect of this disclosure relates to a method of making a rocker assembly. The method comprises the steps of forming a rocker reinforcement panel and a side inner panel that are assembled together to define a cavity. A polymer resin and a continuous fiber roving are pultruded to form a reinforced elongated bar that is assembled into a cavity defined between the rocker reinforcement panel and the side inner panel.

The method may further comprise forming one or more elongated openings in the reinforced elongated bar, injecting an expandable polymeric resin into the elongated opening or openings in the reinforced elongated bar and foaming the expandable polymeric resin to fill the elongated opening or openings.

The above aspects of this disclosure and other aspects will be described below with reference to the attached drawings.

BRIEF DESCRIPTION OF THE DRAWINGS

FIG. 3 is a cross-sectional view taken along the line 3-3 in FIG. 2.

FIG. 4 is a cross-sectional view of an alternative rocker assembly reinforcement with fiber roving concentrated in the corners of the reinforcement profile.

FIG. 5 is a cross-sectional view of an alternative rocker assembly reinforcement having a plank portion reinforced by cylindrical or tubular portions with fiber roving in spaced apart areas of the reinforcement.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
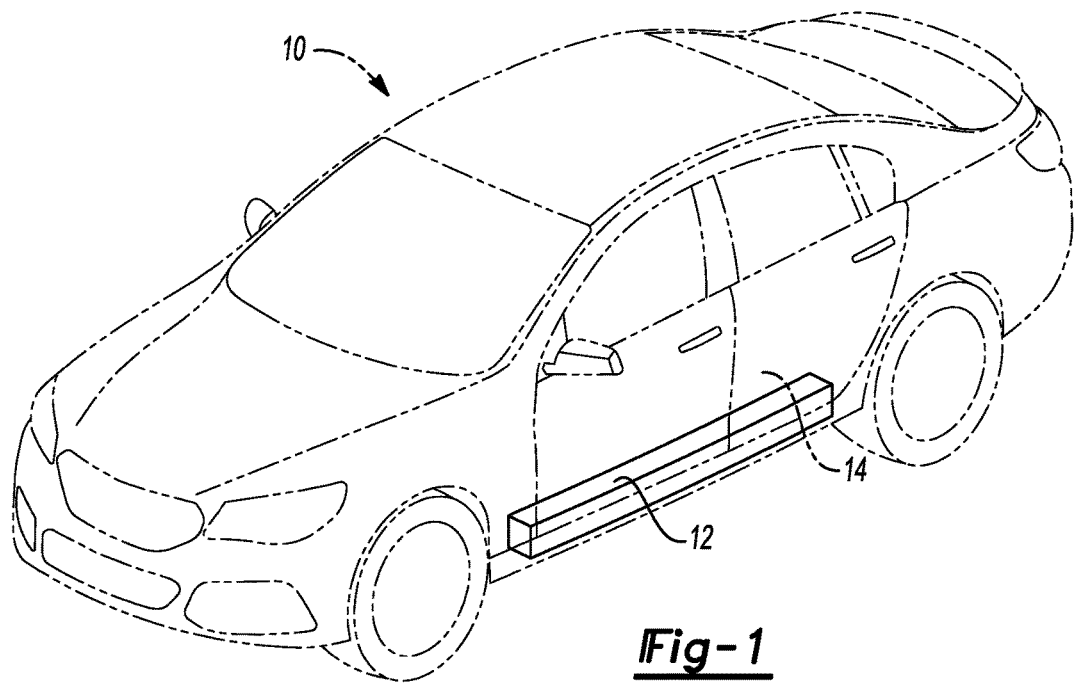
FIG. 1 is a left/front perspective view of a vehicle in phantom lines with a rocker assembly illustrated in solid lines.

Referring to FIG. 1, a vehicle 10 is shown in phantom lines that includes a rocker assembly 12 that is illustrated in solid lines. The rocker assembly 12 is located on the side of the vehicle below the doors 14.

Figure 2:
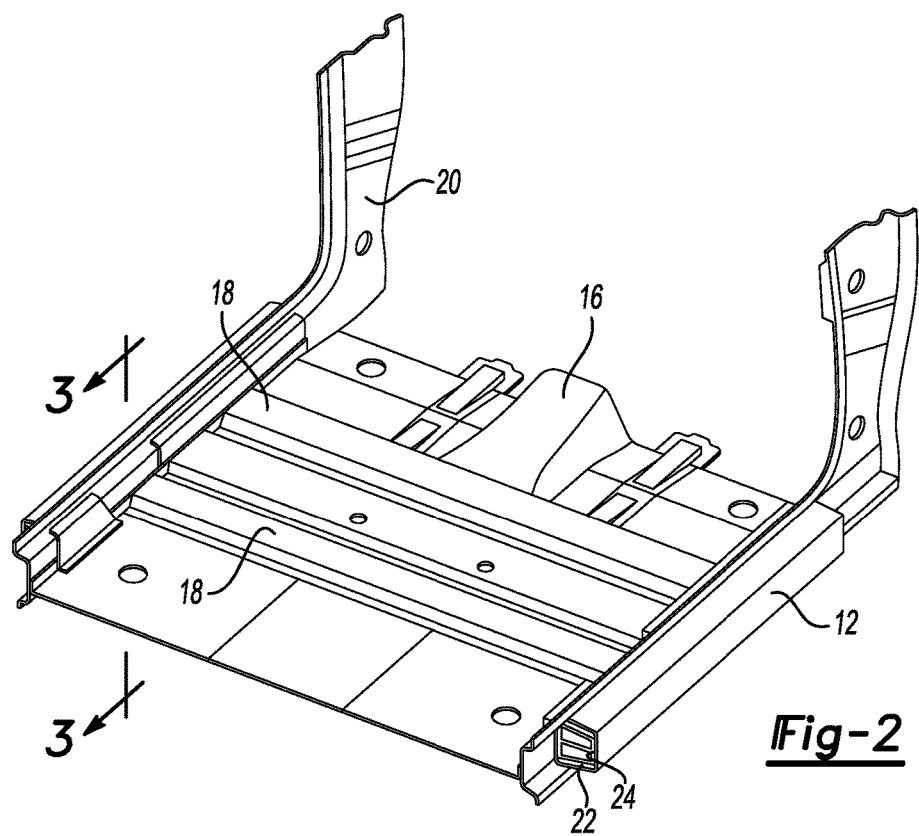
FIG. 2 is a fragmentary perspective view of a floor pan with a pair of rocker assemblies and a pair of A-pillar hinge pillars.

Referring to FIG. 2, two rocker assemblies 12 are shown on opposite lateral sides of a floor pan 16. The floor pan 16 is reinforced with transversely cross-members 18 that extend between and are secured to the rocker assemblies 12. A hinge pillar portion 20 of the A-pillar extends toward the front of the vehicle and upward from the front end of the rocker assembly 12. The rocker assembly defines a cavity 22 and a pultruded reinforcement bar 24 made according to one aspect of this disclosure is shown to be assembled into the cavity 22.

Referring to FIG. 3, a rocker assembly 12 is shown to include a rocker reinforcement panel 26 and a side inner panel 28 that is attached to the rocker reinforcement 26 and defines the cavity 22. The side inner panel 28 is attached to the floor pan 16 and the cross-members 18. The pultruded reinforcement bar 24 is disposed inside the cavity 22 and in contact with the rocker reinforcement panel 26 and the side inner panel 28. The pultruded reinforcement bar 24 may be attached to the rocker reinforcement panel 26 and the side inner panel 28 with an adhesive or with a fastener 29, such as a flow drill screw or rivet.

The pultruded reinforcement bar 24 is formed by extruding a polymeric thermoplastic resin 30 while pulling a fiber roving 32 through an injection molding die as will be described below with reference to FIG. 6. In the pultruded reinforcement bar 24 shown in FIG. 3, an internal wall 36 extends horizontally in a spaced relationship relative to an upper wall 38 and a lower wall 40. The internal wall 36, upper wall 38 and lower wall 40 are joined to an inner wall 42 and an outer wall 44 and define an upper cell 48 and a lower cell 50 within the pultruded reinforcement bar 24.

The internal wall 36, upper wall 38 and lower wall 40 are provided with the fiber roving 32 in the illustrated embodiment and the inner wall 42 and an outer wall 44 have areas that are not reinforced with the fiber roving 32. These unreinforced areas have reduced tensile strength and may be more easily penetrated by fasteners, such as rivets or flow drill screws. The location of the fiber roving 32 can be changed to provide elongated unreinforced areas 51 where required.

The fiber roving 32 may be glass fibers, carbon fibers, aramid fibers or basalt fibers. Basalt fibers offer greater tensile strength than glass fibers. Basalt fibers offer 4-6% elongation at break compared to 1% elongation at break for carbon fibers. Basalt fibers are stiffer than glass fibers and additional stiffness may be obtained by adding carbon fiber to the basalt roving 32. In addition basalt fiber is substantially less expensive than glass or carbon fiber.

The upper cell 48 and lower cell 50 are filled with a polymeric foam material 52. The polymeric foam 52 may be provided in a range of different densities to add strength to the pultruded reinforcement bar 24 as needed. According to this disclosure the strength of the pultruded reinforcement bar 24 and performance in a collision may be tuned by changing the shape or thickness of the walls of the pultruded reinforcement bar 24, the quantity, composition and location of the fiber roving 32 and by changing the density of the foam material 52.

The upper wall 38 and lower wall 40 converge in the outer direction in the illustrated embodiment to form an isosceles trapezoid but, other configurations may be developed that may include parallel walls and additional internal walls. The shape and thickness of the walls may also be varied to meet the strength required to withstand any one of a number of collision tests. Different collision tests simulating actual collision events are performed with load distribution devices that load the rocker assembly 12 along multiple load paths. Both column and bending loads are applied to the rocker assembly 12.

Referring to FIG. 4, an alternative embodiment of a pultruded reinforcement bar 54 is illustrated that may be used to reinforce a rocker assembly 12 or may be used in other applications. The pultruded reinforcement bar 54 has a similar outer shape to the bar shown in FIG. 3 with an upper wall 56 and a lower wall 58 extending between an inner wall 60 and an outer wall 62. The upper wall 56 and lower wall 58 converge in the outer direction. There is no interior wall and a single cell is defined within the pultruded reinforcement bar 54.

No foam filling is shown in FIG. 4 but could be provided if desired. The resin 30 is reinforced with fiber roving 32 in corners 64 of the pultruded reinforcement bar 54. This arrangement would provide strength at the corners 64 and more ductility in the unreinforced areas 51 of the walls 56-62 between the corners 64.

Referring to FIG. 5, yet another alternative embodiment of a pultruded reinforcement bar 64 is illustrated that may be used to reinforce a rocker assembly 12 or another part. The pultruded reinforcement bar 66 has a plank portion 68 reinforced by a cylindrical solid portion 70 and two tubular portions 72. Fiber roving 32 is provided at spaced apart locations in the resin 30 forming the reinforcement bar 66. Additional elongated openings 74 may be provided to further facilitate insertion of fasteners in the plank portion 68.

Figure 6:
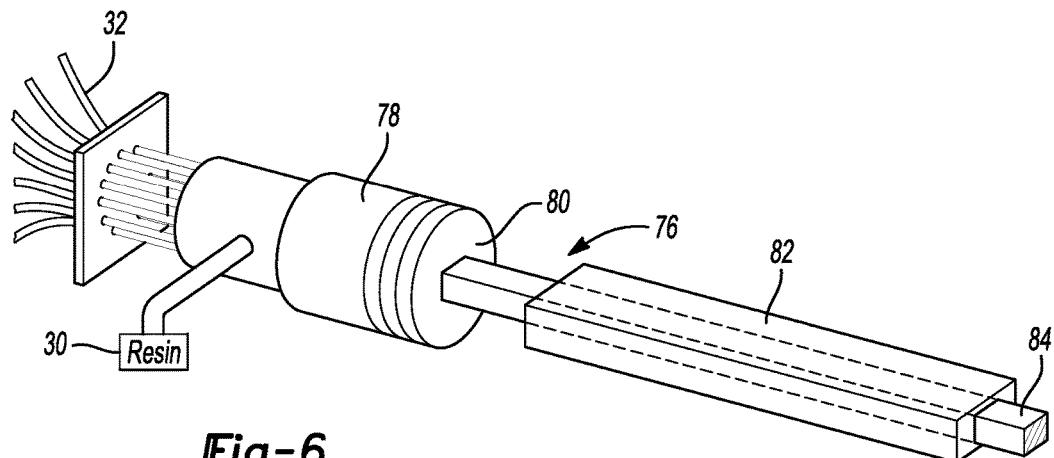
FIG. 6 is a diagrammatic illustration of a pultrusion molding apparatus.

Referring to FIG. 6, a pultrusion manufacturing line is illustrated diagrammatically and generally indicated by reference numeral 76. Resin 30 is supplied in molten condition to an injection molding head 78. Fiber roving 32 is fed into the injection molding head 78 and pulled through the die 80. A water tank 82 is provided for cooling the extrusion and form a continuous pultruded bar 84.

Figure 7:
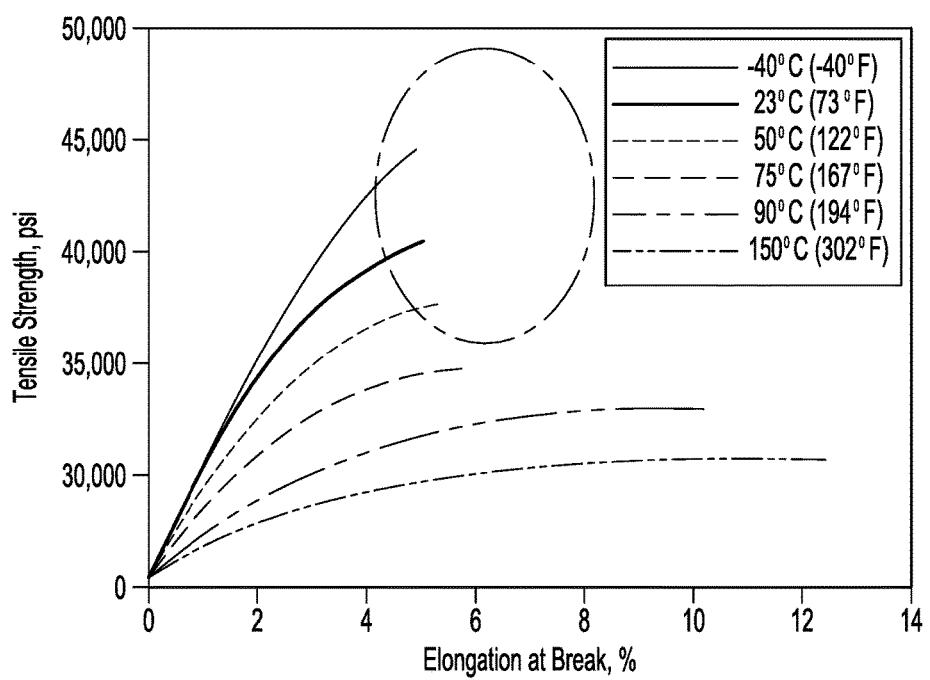
FIG. 7 is a graph showing a simulation of the percent elongation to breaking versus tensile strength of a pultruded basalt fiber filled resin within a designated operating temperature range.

Referring to FIG. 7, a graph is provided that show the results of a simulation of the percent elongation to breaking versus tensile strength of a pultruded basalt fiber filled resin within an operating temperature range. The operating temperature range is indicated by the oval line that indicates an acceptable level of tensile strength of between 36,000 and 48,000 psi in a temperature range of between −40° C. and 50° C. The elongation at break is shown to be between 4 and 8%.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A rocker assembly comprising:
   a rocker reinforcement panel;
   a side inner panel attached to the rocker reinforcement panel and defining a cavity; and
   an elongated bar having a constant cross-section perpendicular to the length of the bar and defining a plurality of elongated openings disposed within the cavity, the bar includes polymer resin including strands of continuous fiber roving that are embedded in the polymer resin and extend along a full length of the bar.

2. The rocker assembly of claim 1 wherein the elongated bar has a constant cross-section perpendicular to the length of the bar and further comprises:
a plurality of inner walls that divide the elongated opening into a plurality of cells that extend throughout the length of the bar.

3. The rocker assembly of claim 1 further comprising:
a structural expanded foam polymer composition deposited in the elongated opening, wherein the foam polymer composition has a density of between 0.2 g/cc to 0.9 g/cc.

4. The rocker assembly of claim 3 wherein the foam polymer composition is polyurethane foam.

5. The rocker assembly of claim 1 wherein the polymer resin is polyethylene terephthalate.

6. The rocker assembly of claim 1 wherein the reinforcement strands of continuous fiber are selected from the group consisting of:
carbon fibers;
aramid fibers;
glass fibers; and
basalt fibers.

7. A rocker assembly comprising:
a rocker reinforcement panel;
a side inner panel attached to the rocker reinforcement panel and defining a cavity; and
an elongated bar disposed within the cavity, the bar includes polymer resin including strands of continuous fiber roving that are embedded in the polymer resin that extend along a full length of the bar, wherein the reinforcement strands of continuous fiber are in specified areas of the elongated bar where it is desired to increase strength locally, and wherein strands are spaced apart in other areas of the bar to provide areas of greater ductility and less strength.

8. The rocker assembly of claim 7 further comprising:
fastener receiving lengthwise extending strips provided in the other areas of the bar that are of greater ductility.

9. A rocker assembly comprising:
a rocker reinforcement panel;
a side inner panel attached to the rocker reinforcement panel and defining a cavity; and
an elongated bar disposed within the cavity, the bar includes polymer resin that includes reinforcement strands of continuous fiber roving that are embedded in the polymer resin and extend along a full length of a plurality of outer walls of the bar that define an elongated opening, wherein the elongated bar has a constant cross-section perpendicular to the length of the bar and a plurality of inner walls that divide the elongated opening into a plurality of cells that extend throughout the length of the bar, wherein the reinforcement strands of continuousfiber roving are embedded in the polymer resin and extend along a full length of the inner walls and the outer walls.

10. A method of making a rocker assembly comprising:
forming a rocker reinforcement panel;
forming a side inner panel;
assembling the rocker reinforcement panel to the side inner panel;
pultruding a polymer resin and a continuous fiber roving to form a reinforced elongated bar;
forming an elongated opening in the reinforced elongated bar; and
assembling the reinforced elongated bar into a cavity defined between the rocker reinforcement panel to the side inner panel.

11. The method of claim 10 further comprising:
forming a plurality of elongated openings in the reinforced elongated bar.

12. The method of claim 10 further comprising:
forming an elongated opening in the reinforced elongated bar;
injecting an expandable polymeric resin into the elongated opening in the reinforced elongated bar; and
foaming the expandable polymeric resin to fill the elongated opening.

13. The method of claim 10 further comprising:
forming a plurality of elongated openings in the reinforced elongated bar;
injecting an expandable polymeric resin into the elongated openings in the reinforced elongated bar; and
foaming the expandable polymeric resin to fill the elongated openings.

* * * * *